Figure 1:
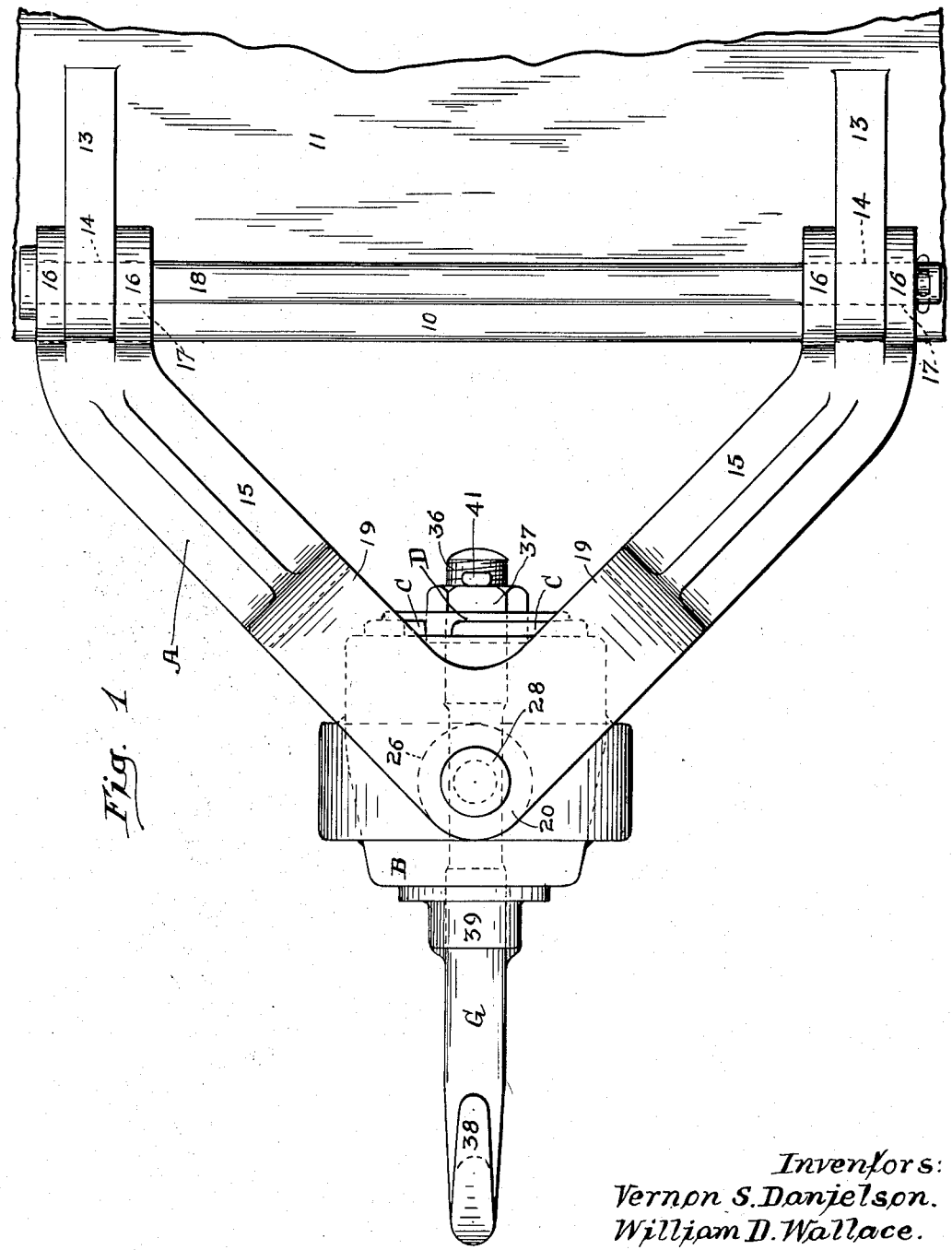

Dec. 29, 1953   V. S. DANIELSON ET AL   2,664,300
DRAFT RIGGING FOR VEHICLES
Filed July 11, 1951   2 Sheets-Sheet 1

Inventors:
Vernon S. Danielson.
William D. Wallace.
By Henry Fuchs
Atty.

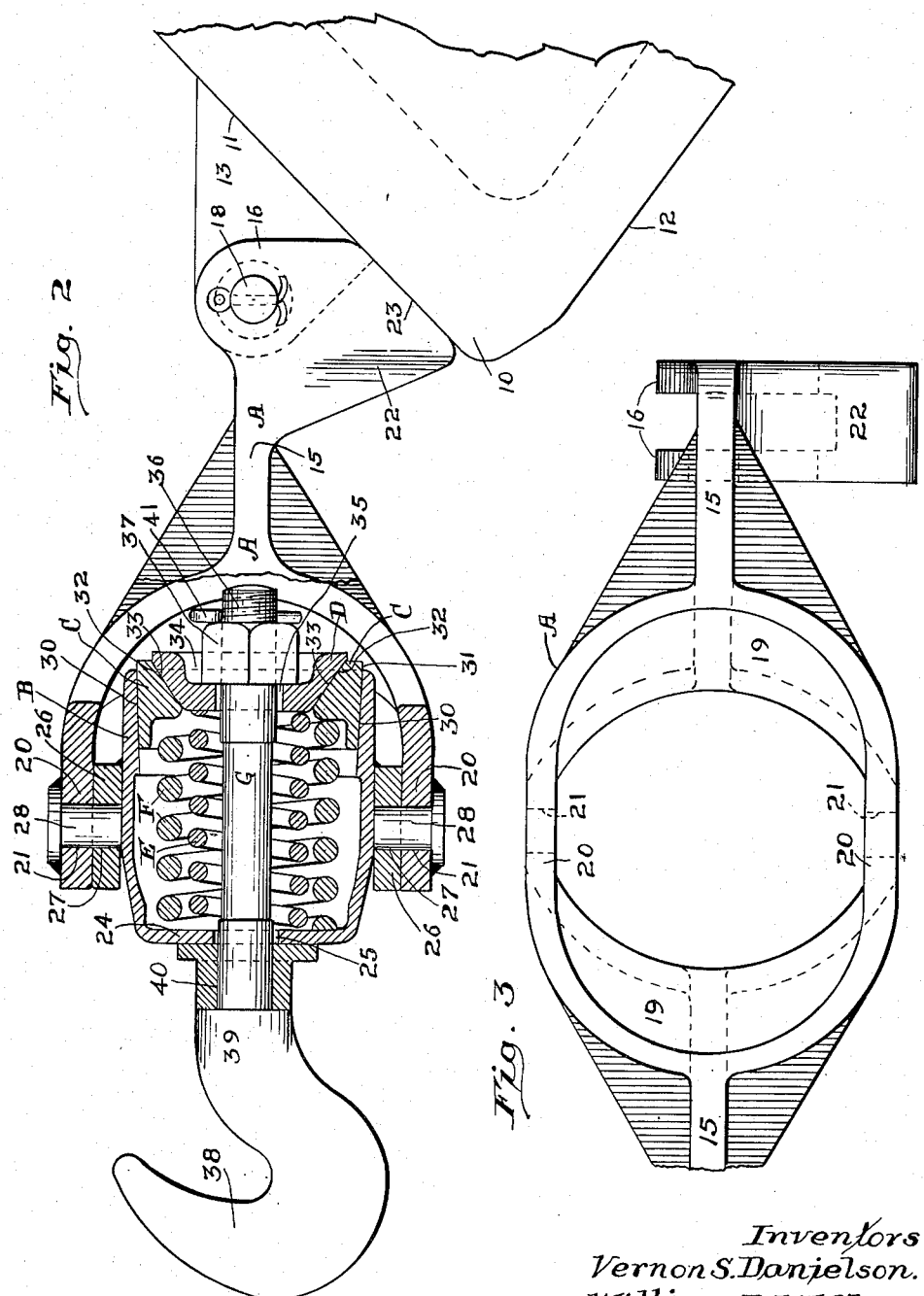

Patented Dec. 29, 1953

2,664,300

UNITED STATES PATENT OFFICE 2,664,300

DRAFT RIGGING FOR VEHICLES

Vernon S. Danielson, Dolton, and William D. Wallace, Park Forest, Ill., assignors to W. H. Miner, Inc., Chicago, Ill., a corporation of Delaware Application July 11, 1951, Serial No. 236,211

4 Claims. (Cl. 280—486)

This invention relates to improvements in draft riggings for vehicles, such as army tanks.

One object of the invention is to provide a draft rigging for vehicles, adapted to be coupled together, wherein universal, as well as rotary, adjustment of the coupling means is provided for.

A further object of the invention is to provide a draft rigging, including a supporting frame, a friction shock absorber mounted on the supporting frame and actuated in draft by a drawbar, wherein the supporting frame is pivotally connected to a vehicle for swinging movement, and the shock absorber is swivelled on the supporting frame for rotation on an axis at right angles to the axis of swinging movement of the supporting frame, thus providing for universal pivotal adjustment of the drawbar with respect to the vehicle, and further providing for rotary adjustment of the drawbar about its longitudinal central axis.

A more specific object of the invention is to provide a draft rigging for vehicles comprising a supporting member pivoted to the end of the vehicle for swinging movement on a horizontal axis, a friction shock absorber including a friction casing and a friction clutch slidable within the casing, and a drawbar for pulling the clutch inwardly of the casing in draft, wherein the casing is swivelled to the supporting member for rotation about an axis at right angles to the axis of pivotal movement of the supporting member, thereby providing for universal pivotal adjustment of the drawbar, and wherein the drawbar is rotatable on its longitudinal axis with respect to the friction shock absorber, thereby providing for rotary adjustment of the drawbar in addition to its universal pivotal adjustment.

Other objects of the invention will more clearly appear from the description and claims hereinafter following.

In the accompanying drawings forming a part of this specification, Figure 1 is a top plan view of our improved draft rigging, illustrating the same as applied to the front end portion of an army tank, said front end portion of the tank being shown broken away. Figure 2 is a side elevational view of Figure 1, showing the friction shock absorber and certain other parts of the draft rigging in vertical longitudinal section. Figure 3 is a front elevational view of the swinging supporting member shown in Figure 1.

Our improved draft rigging comprises a swinging supporting member A, a friction casing B swivelled on the supporting member, friction shoes C—C—C slidingly telescoped within the casing, a wedge block D, springs E and F within the casing yieldingly opposing forward movement of the shoes, and a drawbar G connected to the wedge block for actuating the friction shock absorber.

In Figures 1 and 2, 10 indicates the front end portion of a well-known design of army tank. As shown, this front end portion includes a forwardly extending, downwardly sloping top wall 11 and a downwardly sloping bottom wall 12, extending rearwardly from the lower end of the wall 11.

In carrying out our invention, upstanding ears 13—13 are provided on the end 10 of the army tank to which the inner end portion of the supporting member A is swingingly connected. Each ear 13 is in the form of a substantially triangular block secured to the wall 11 of the tank, being preferably welded to the same. The ears 13—13 are laterally spaced apart and have aligned pivot pin receiving openings 14—14.

The supporting frame member A is of V-shaped formation in plan, including a pair of rearwardly diverging arms 15—15, having angularly disposed forked ends 16—16, the spaced sections of each forked end portion being perforated to provide pivot pin receiving openings 17—17. The spaced sections of the forked portion 16 of each arm 15 receive the corresponding ear 13 therebetween, and an elongated pivot pin 18 extending through the perforations of the fork sections of the arms 15—15 and perforations in the ears 13—13 pivotally connect the member A to the tank portion 10 for swinging movement in a vertical plane. At the front end, the member A presents a socket 19 which is open at both the front and rear ends, as shown in Figure 3, and has the side walls thereof diverging forwardly. The socket 19 is integral with the front end portions of the arms 15—15 and the side walls of said socket are curved, or rounded, as shown. The top and bottom wall portions of the socket 19, which wall portions are indicated by 20—20, are substantially flat. The flat top and bottom walls 20—20 are provided with vertically aligned pin receiving openings 21—21.

As shown most clearly in Figure 2, each arm 15, at the forked end thereof, is provided with depending flanges or wings 22—22, which have inclined bottom end faces 23—23 adapted to seat on the wall 11 of the tank portion 10 to support the swinging member A in horizontal position.

The friction casing B is in the form of a hollow, tubular member open at its rear end and closed at its front end by a transverse wall 24, having a central opening 25 to accommodate the drawbar G. The casing B is arranged within the socket 19 of the member A. A ring 26 surrounds the casing B and is fixed thereto, preferably by being welded to the same. The ring 26 is in the form of a relatively wide band, having bearing openings 27—27 in the top and bottom portions thereof, aligned with the openings 21—21 of the socket 19 of the member A. The casing B is swivelled to the member A by means of trunnions which are in the forms of headed pins 28—28, fixed to the member A and extending into the bearing openings 27—27 in the top and bottom portions of the ring 26 of the casing B. The pins 28—28 extend through the openings 21—21 of the walls 20—20 of the socket 19 with the heads abutting the outer sides of said walls. The pins 28—28 are fixed to the member A, the heads of said pins being preferably secured by being welded to the walls 20—20. At the open end thereof, the casing B is provided with inwardly converging friction surfaces 30—30.

The friction shoes C are slidingly arranged within the casing B in frictional contact with the friction surfaces 30—30. The shoes C are preferably three in number, arranged symmetrically about the longitudinal axis of the casing. Each shoe C has a lengthwise extending friction surface 31 on its outer side engaging the corresponding friction surface 30 of the casing. On its inner side, each shoe C is provided with a wedge face 32.

The wedge block D is arranged at the rear end of the casing B and has three wedge faces 33—33—33 thereon, engaging the wedge faces 32—32—32 of the shoes C—C—C, respectively. The wedge block D has a rearwardly opening, central seat 34 therein for a purpose hereinafter pointed out. The block D is further provided with a central opening 35 therethrough, communicating with the seat 34.

The springs E and F, which are in the forms of helical coils, are arranged within the casing B, the spring F being heavier than the spring E and surrounding the latter. The spring E has its front and rear ends bearing respectively on the wall 24 of the casing B and the inner end of the wedge block D, and the spring F has its front and rear ends bearing respectively on the wall 24 and the inner end portions of the shoes C—C—C.

The drawbar G is in the form of a heavy cylindrical shaft having threads 36 at its rear end with which a nut 37 is engaged. A hook-shaped coupler 38 is fixed to the front end portion of the drawbar G, the shank of the coupler 38, which is indicated by 39, being provided with a bore 40 within which the front end of the drawbar G is seated. The rear end of the coupler shank 39 bears on the front end of the casing B, that is, on the outer side of the wall 24 of said casing. The drawbar G extends through the opening 25 of the wall 24 of the casing, the spring E, the opening 35 of the wedge block D, and into the seat 34. The nut 37, which is threaded on the drawbar G, is accommodated in the seat 34 of the wedge block D, and, by shouldered engagement with the inner wall of said seat, limits the outward movement of the wedge block with respect to the casing B, and further serves to hold the mechanism assembled. The nut 37 is preferably retained in position by a cotter pin 41 extending through the rear end portion of the drawbar G. The drawbar G is rotatable about its axis in the casing B and wedge block D, thus providing adjustment for relative twisting movement of two coupled tanks.

As will be evident, our improved draft rigging provides for universal pivotal adjustment of the coupler with respect to the tank, through pivotal swinging movement of the supporting member A on the tank, and swivelling of the friction casing B with respect to the frame A.

The operation of the improved mechanism is as follows: Upon a pulling force being transmitted to the drawbar G, the wedge block D is forced inwardly of the casing B, wedging the spring resisted shoes C—C—C apart, into tight frictional engagement with the casing friction surfaces 30, and sliding the same inwardly on said surfaces, thereby providing high frictional resistance to shocks imparted to the drawbar.

We claim:

1. In a draft rigging for vehicles, the combination with a supporting member pivotally connected at one end to a vehicle for swinging movement in a vertical plane, said supporting member being forked at its other end providing spaced top and bottom arms; of a friction shock absorber between said arms including a friction casing swivelled between its ends to said arms for rotation about a vertical axis; and a drawbar connected to said shock absorber for actuating the same.

2. In a draft rigging for vehicles, the combination with a supporting member comprising two barlike sections pivotally connected at their inner ends to a vehicle for swinging movement about a horizontal axis, said barlike sections converging and merging with each other at their other ends, said merging portions presenting a pocket having spaced top and bottom walls; of a friction shock absorber in said pocket between said top and bottom walls, said shock absorber including a casing, and a friction clutch slidable within the casing, said casing having top and bottom aligned bearing openings between its ends; trunnions on said top and bottom walls extending into said bearing openings for swivelling said casing to said supporting member; and a drawbar extending through said casing and clutch and having shouldered engagement with the latter to actuate the same.

3. In a draft rigging for vehicles, the combination with a supporting member comprising rearwardly diverging arms, each pivotally connected at its extremity to the body of a vehicle for swinging movement in a vertical plane, said member having a pocket at its outer end formed partly by each of said arms, said pocket having top and bottom walls; of a friction shock absorber including a friction casing; a ring fixed to said casing midway between the ends thereof, said ring having top and bottom bearing openings; trunnions on said top and bottom walls of said pocket engaged in the bearing openings of said ring for swivelling said casing for rotation about a vertical axis; and a drawbar extending through said shock absorber, and being mounted in said shock absorber for axial rotation with respect to the latter, said drawbar being operatively connected to said shock absorber for actuating the latter.

4. In a draft rigging for vehicles, the combination with a horizontally arranged supporting member having diverging arms forming a V-shaped structure, said arms being pivotally connected to a vehicle for swinging movement about horizontal axes, said V-shaped member having a pocket at the apex of the V thereof presenting top and bottom walls; of a friction casing in said pocket; a ring fixed to said casing midway between the ends thereof, said ring being provided with vertically disposed top and bottom bearing openings; trunnions on said top and bottom walls of said pocket engaged in the openings of said ring for supporting said casing for rotation about a vertical axis; friction shoes slidable within the casing; springs within the casing yieldingly opposing inward movement of said shoes; a block in wedging engagement with said shoes; and a cylindrical drawbar extending through said casing and block, said drawbar having shouldered engagement with the block to pull the same inwardly of the casing in draft.

VERNON S. DANIELSON.
WILLIAM D. WALLACE.

References Cited in the file of this patent

UNITED STATES PATENTS

| Number | Name | Date |
|---|---|---|
| 2,057,658 | Bryant | Oct. 20, 1936 |
| 2,403,585 | Dath et al. | July 9, 1946 |
| 2,551,709 | Skinner | May 8, 1951 |